United States Patent
Denman

[19]

[11] Patent Number: 5,964,858
[45] Date of Patent: Oct. 12, 1999

[54] DIGITAL COMMUNICATION UNIT MONITORING

[75] Inventor: Paul William Denman, Bedfont, United Kingdom

[73] Assignee: Motorola, Inc., Schaumburg, Ill.

[21] Appl. No.: 08/596,113

[22] PCT Filed: Aug. 1, 1994

[86] PCT No.: PCT/GB94/01684

§ 371 Date: Jun. 17, 1996

§ 102(e) Date: Jun. 17, 1996

[87] PCT Pub. No.: WO95/04323

PCT Pub. Date: Feb. 9, 1995

[30] Foreign Application Priority Data

Jul. 30, 1993 [GB] United Kingdom .................. 9315753

[51] Int. Cl.⁶ .................................................. G06F 13/38
[52] U.S. Cl. ......................................... 710/129; 710/107
[58] Field of Search .................................. 395/280, 287,
395/309, 310; 710/100, 107, 129, 130

[56] References Cited

U.S. PATENT DOCUMENTS

| | | | |
|---|---|---|---|
| 4,286,321 | 8/1981 | Baker et al. ............................. | 364/200 |
| 4,891,752 | 1/1990 | Fairman et al. ......................... | 364/200 |
| 4,899,230 | 2/1990 | Sherritt ...................................... | 360/15 |
| 4,901,232 | 2/1990 | Harrington et al. ..................... | 364/200 |
| 4,920,480 | 4/1990 | Murakami et al. ...................... | 364/200 |
| 4,967,344 | 10/1990 | Scavezze et al. ........................ | 364/200 |
| 4,967,398 | 10/1990 | Jamoua et al. ...................... | 365/230.05 |
| 5,109,500 | 4/1992 | Iseki et al. ............................... | 395/425 |
| 5,260,555 | 11/1993 | Sakamoto ................................ | 235/492 |
| 5,280,599 | 1/1994 | Arai ......................................... | 395/425 |
| 5,305,317 | 4/1994 | Szczepanek ........................... | 370/85.5 |
| 5,321,819 | 6/1994 | Szczepanek ............................. | 395/325 |
| 5,386,579 | 1/1995 | Bourekas et al. ....................... | 395/800 |
| 5,430,844 | 7/1995 | Shitara et al. .......................... | 395/200 |
| 5,515,523 | 5/1996 | Kalkunte et al. ....................... | 395/476 |
| 5,715,419 | 2/1998 | Szczepanek et al. ............... | 395/421.02 |

*Primary Examiner*—Paul R. Myers
*Attorney, Agent, or Firm*—Randal S. Vaas; Rolland R. Hackbart; Brian M. Mancini

[57] ABSTRACT

A communications unit includes a processor (11), a data bus (12), an address bus (13), memory means (14,15,16), a data interface (36) between the data bus and a host computer (35), and a monitoring interface (30) with the host computer. The monitoring interface (30) includes monitoring address generating means fed from the host computer and including a bank register (31) loadable by the host computer as its high-order portion and a direct path (32) from the host computer as its low order portion. The monitoring interface also includes address coupling means (18) for passing the contents of the monitoring address generating means to the address bus (13) to address the memory means (14,15,16) of the communications unit directly. The host computer can also write to the unit via the monitoring interface.

8 Claims, 3 Drawing Sheets

DIGITAL COMMUNICATION UNIT MONITORING

FIELD OF THE INVENTION

The present invention relates primarily to digital communication units, and more specifically to means for monitoring their operation.

BACKGROUND OF THE INVENTION

Computers frequently need to communicate over communication systems. Although it is possible in principle to design a computer with a communications capability as an integral part of the computer, in practice the communications capability is normally designed as a broadly distinct component, a digital communication unit which interfaces between the computer and the communication system. The computer (excluding the communication unit) is then normally termed the host computer or system.

There are many different types of communication systems. Among the many factors which may vary are whether the system is serial or parallel, and the speed of the system (which may be between some hundreds of bits per second and megabits per second). There is also a variety of different protocols, concerned with such things as different ways of formatting data to be transmitted and different ways of controlling the routing of messages through the communication system. There are also various different techniques for error detection and correction. There are also, of course, many different types of computer.

The degree of complexity which is required of a communication unit depends on the circumstances which it is intended for. A unit which is intended for a specific application involving low speeds and a highly reliable communication system which requires minimal switching or routing and little or no error detection and correction may be relatively simple. But such a unit would be useful only in very specific circumstances. In general, communication units tend to be designed for as much generally as feasible, so that they can be used in conjunction with a wide variety of host computers and a wide range of communications systems.

This means that communication units are normally of considerably complexity. A typical such unit will naturally have a substantial amount of circuitry concerned with specific communications tasks such as a variety of interfacing devices for different types of communication system, and of course an interfacing means for the host computer. In addition, it will have a fairly powerful general-purpose data processing capability, provided by e.g. a RISC processor (conventionally termed a CPU), 32-bit data and address buses (or a combined data and address bus), associated instruction and data memories of a size typically of the order of a megaword, and various other associated circuitry.

The complexity of the communication unit means that it is liable to a variety of faults, typically arising from the complexity of the programs which it requires to deal with the wide variety of host computers and communication systems which it has to interface with and the wide variety of unexpected combinations of conditions which it may encounter during operation.

The communication unit is, as noted above, in effect a peripheral unit or component of the host computer. As with other peripheral units, the communication unit can therefore be designed so that it can be monitored by the host computer. A state or condition register can be provided which will be set, during the operations of the unit, to indicate the occurrence of a variety of specific conditions, and the host computer can monitor this register. Similarly, a control register can be provided which can be set by the host computer to control a variety of operations in the unit.

Obviously, several state or condition registers and several control registers can be provided, to enable the host computer to monitor and control the operation of the unit in more detail. Also, the unit's own processing power can be utilized, by including suitable programs in its memory which use the unit's own CPU to select the conditions to be reported through the state or condition register and to select the unit's response to control signals from the host computer passed through the control register. This allows the unit to be monitored and controlled by the host computer to as close a degree as required.

DETAILED DESCRIPTION OF THE PREFERRED EMBODIMENT

We have realized, however, that a different approach to the problem of monitoring (and, preferably, also controlling) a communication unit by a host computer is possible, and gives considerable advantages over the standard techniques outlined above. This approach also provides an alternative way for the host computer to communicate generally with the communication unit.

The present invention provides a communication or like unit comprising a processor, a data bus, an address bus, memory means, a data interface between the data bus and a host computer, and a monitoring interface with the host computer, characterized in that the monitoring interface comprises: monitoring address generating means fed from the host computer and including a bank register loadable by the host computer with the high-order portion of an address, and a substantially direct path from the host computer for carrying the low order portion of an address; and address coupling means for passing the output of the monitoring address generating means to the address bus to address the memory space of the communication system directly.

It will be realized that this system may find applications in the monitoring, by a host computer, of units other than communication units in the strict or narrow sense.

Figure 1A:
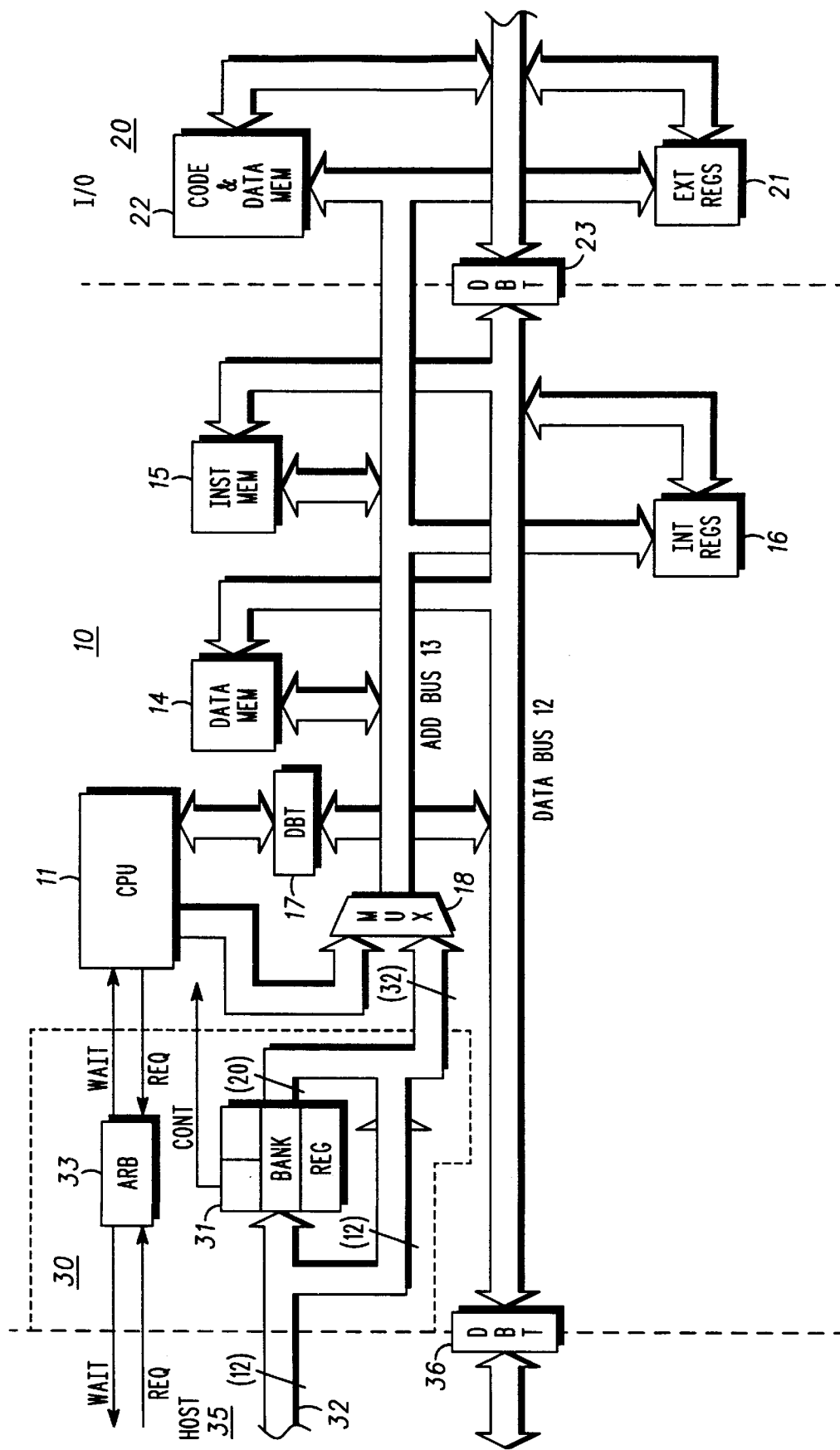
FIG. 1A and FIG. 1B show simplified block diagrams of two embodiments of the unit, in accordance with the present invention.
Figure 1B:
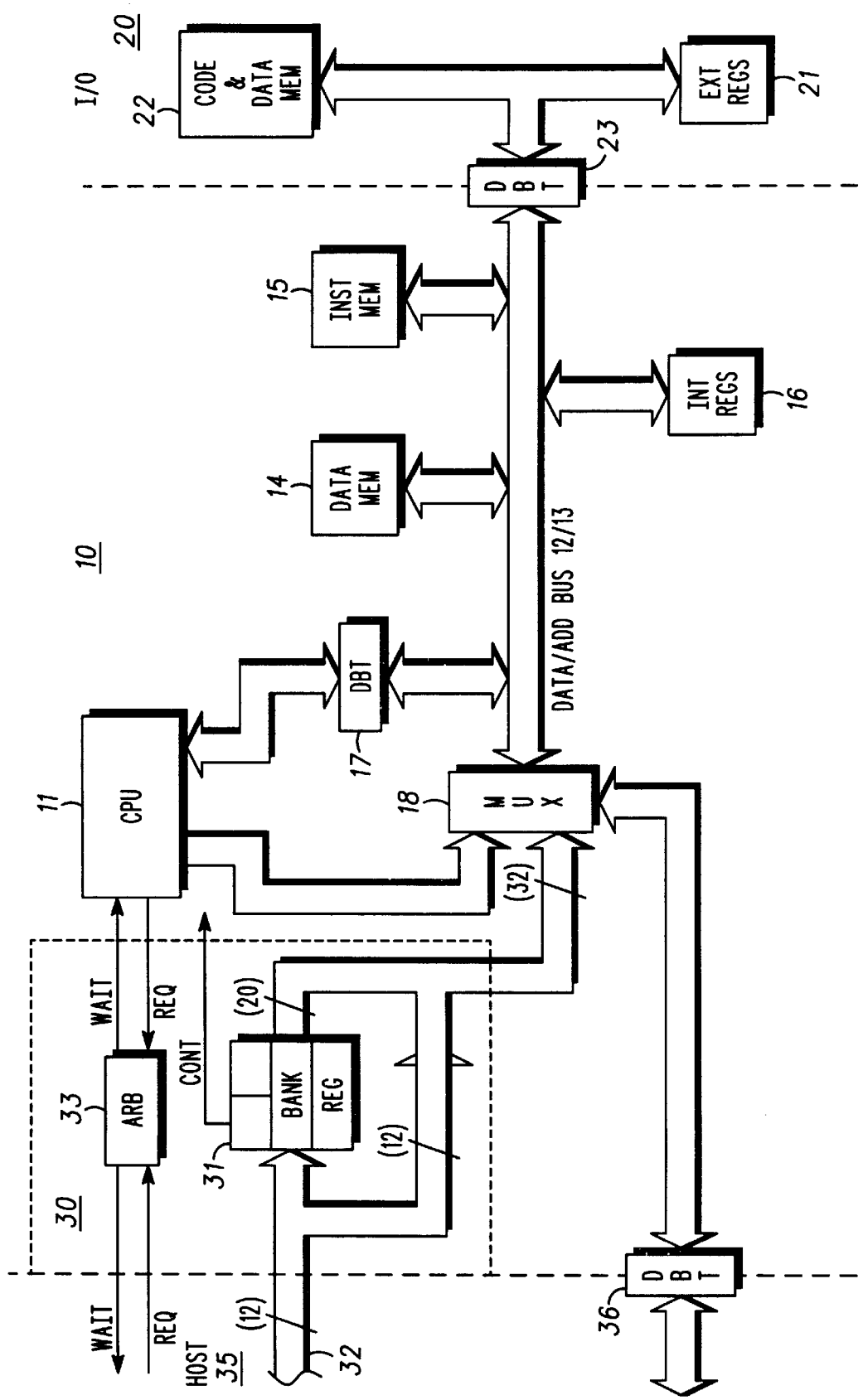

The data bus and the address bus may be a common physical bus on which addresses and data are multiplexed (as shown in FIG. 1B).

With this arrangement, the host can therefore monitor blocks of addresses of substantial size in the memories of the unit. This allows a much wider view of the state of the unit than can be achieved by monitoring a single special register (or a few such registers).

Another important advantage of this arrangement is that the monitoring is controlled by the host computer rather than by the unit itself. Hence if the unit is malfunctioning, due e.g. to some error in its programming, it can still be monitored.

All devices attached to the buses are preferably addressable by addresses placed on the address bus by the CPU. With a 32-bit wide bus, the abstract memory space is of the order of a gigaword (disregarding possible complications of 4-byte words and of byte select bits at the bottom end of the memory address, which are irrelevant for the present purposes). This is far larger than any real memory space such as data and instruction memories. It is therefore conventional to use memory addresses to select all devices attached to the buses, including input and output devices and various registers. The top end bits of the memory address are used to distinguish between "real" memory and other devices, and most of the lower end address bits are ignored when selecting registers and similar devices.

With this arrangement, the host can therefore monitor not just blocks of addresses in the real memories of the unit, but it can also monitor all the registers and peripheral devices of the unit, in exactly the same way as these can be addressed by the unit's own CPU.

Preferably the monitoring interface can also pass a write signal to the unit and the data coupling means are bidirectional. This will allow the host computer not only to monitor and desired components (memory areas, registers, and/or peripherals) of the unit, but also to directly control or drive those components.

A further major advantage of this arrangement is that the monitoring interface can not merely be used for monitoring and control but can also be used as a fast data transfer path under control of the host computer, as an alternative to the normal data flow path under the control of the communication unit itself.

Preferably the unit includes an arbitrator consisting of a state machine which arbitrates between bus usage requests from the CPU and the monitor interface, to prevent interference between competing requests.

A communication unit embodying the invention will now be described, by way of example, with reference to the drawings.

Referring to FIG. 1A and FIG. 1B, the communication unit comprises a computer system 10 together with various input/output devices collectively shown as a unit 20. This system is coupled to a host computer 35. The computer system 10 is a 32-bit system, while the host computer 35 may typically be a 16-bit personal computer.

The computer system 10 comprises a processor CPU 11 coupled to two buses, a data bus DATA BUS 12 and an address bus ADD BUS 13, which have coupled to them a data memory DATA MEM 14, an instruction memory INST MEM 15, and a variety of internal registers shown as a block INT REGS 16; as discussed above, the registers as well as the memories can be addressed by means of addresses on the address bus. The CPU is coupled to the data bus via a set of data bus buffers or transceivers DBT 17, which essentially enable bus access. The CPU is coupled to the address bus 13 via a multiplexer 18, for reasons which will be discussed later. The system also includes a control bus (not shown), which carries a variety of control signals, such as a read/write signal.

The data and address buses are also coupled to the input/output devices 20. These devices may for example include UARTs (universal asynchronous receiver transmitters), USARTs (universal synchronous/asynchronous receiver transmitters), and so on, which are in turn coupled to a variety of communication systems which may range through telephone lines to LANs, WANs, switching networks, and other high speed digital data transmission systems.

These input/output devices are shown collectively as a single unit 20 comprising a set of external registers EXT REGS 21 and a code and data memory CODE & DATA MEM 22. The external registers (so called because the unit 20 may be on a separate chip from the CPU 11) and the code and data memory are coupled to the data bus (via a set of data bus transceivers DBT 23) and to the address bus. These registers and memory can therefore be addressed and data transferred to and from them by the CPU 11. (A high address bit is conventionally used to distinguish between the on-chip address space in which the memories and registers 14–16 reside and the off-chip address space in which the registers and memory 21 and 22 reside.)

The data bus is also coupled, through a set of data bus transceivers DBT 36, to the host computer 35. The unit can therefore receive incoming messages from data transmission systems by means of the input/output devices 20, process the information in them by means of the CPU 10 and memories 13 and 14, and forward the processed information to the host computer via the data bus transceivers 36. Similarly, the unit can receive information from the host computer via the data bus transceivers 36, process the information by means of the CPU 10 and memories 13 and 14, and transmit the information to data transmission systems in the form of messages via the input/output devices 20.

The computer system 10 also includes a monitoring interface 30 which couples it to the host computer. This monitoring interface comprises a bank register 31, which is driven from the host computer, and a bus 32; the bank register 31 and bus 32 are coupled to the multiplexer 18 which drives the address bus 13. The host is also coupled to the unit by certain control signals, such as request and wait signals discussed above.

The bus 32 can conveniently be 12 bits wide and drives the bottom 12 bits of the address bus; the bank register 31 will then contain 20 address bits and will drive the top 20 bits of the address bus. The bank register 31 and the bus 32 together thus provide a full 32-bit address. (Bus widths are shown by the usual convention of a diagonal bar across the bus with the number of bits against it. To reduce confusion with the item references, bus widths are shown in brackets.)

Figure 2:
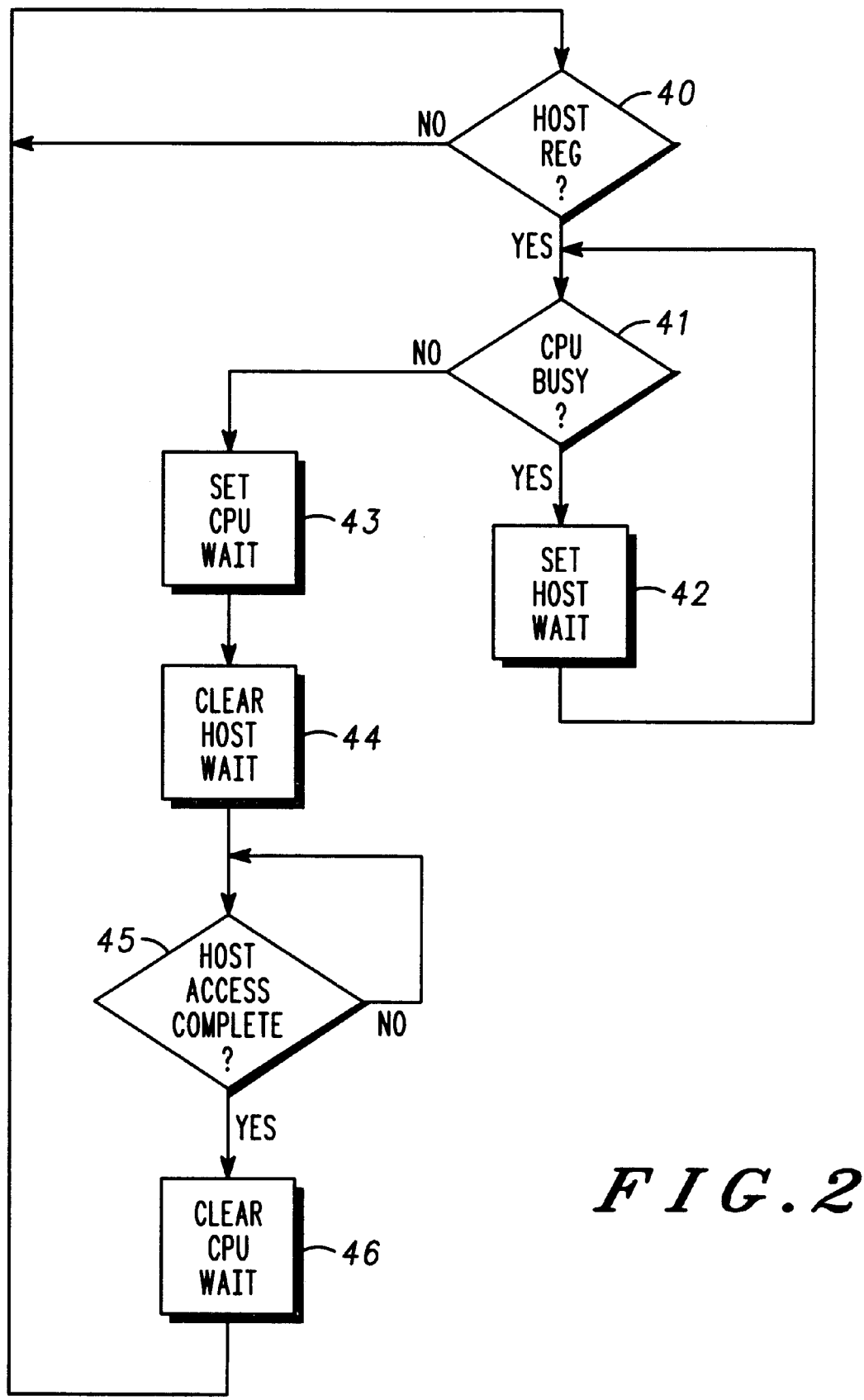
FIG. 2 is a flow diagram of the operation of the arbitrator unit of the system.

The multiplexer 18 is controlled by an arbitrator ARB 33 which is a state machine which arbitrates between requests from the host computer and the CPU. FIG. 2 is a flow diagram illustrating its operation.

Block 40 tests for whether there is a monitoring access request from the host computer. If there is not, the arbitrator cycles to remain in block 40. If there is a monitoring access request from the host computer, the arbitrator tests whether the CPU is busy (block 41). If it is, the host wait signal is set (block 42) and the system returns to block 41. If the CPU is not busy, or when the CPU ceases to be busy, the arbitrator sets the CPU wait signal (block 43) and then clears the host wait signal (block 44). The host access then begins, and the arbitrator monitors the host access (block 45) to determine when the access is complete. When the host access is finished, the arbitrator releases the CPU wait signal (block 46), and returns to block 40.

Thus, referring back to FIG. 1A and FIG. 1B, when the host wants to monitor the unit, the host sets the contents of the bank register 31 and then makes a monitoring access request. The arbitrator allows the CPU to finish whatever it is currently doing, and then allows the access. The multiplexer 18 is switched to pass the desired address from the monitoring circuitry 30 to the address bus. This desired address (in memory or registers of the main circuitry of an input/output unit, as determined by the top part of the bank address) is thus read out, and its contents are then passed over the data bus and via the data bus transceivers 36 to the host computer.

The CPU will normally be running some program, which will involve it in fetching instructions and reading and writing data. These actions involve the CPU using the bus, but such use is generally not continuous. When host monitoring is initiated, the arbitrator in effect detects a free bus cycle, i.e. a cycle during which the bus is not being used, and allows the host access to occur. Once the host has completed its word access, the arbitrator in effect checks to see whether the CPU wants to use the bus again for normal processing. Thus if a monitoring operation involves a sequence of words, the reading of the successive words of the sequence will generally be interleaved with the operations of the CPU. The program the CPU is running will continue to run, though its speed will generally be somewhat reduced during the monitoring operation.

Since the bank register 31 is 20 bits long while the host computer 35 is a 16-bit system, the bank register will be loaded in sections by the host computer. The bus 32, which feeds both the bank register 31 and the multiplexer 18, is 12 bits wide, so the host computer can drive this bus using the bottom 12 bits of its 16-bit words.

It is convenient for the bank register 31 to consist of 3 1-byte sections, so that its length is 24 bits. Of these 24 bits, 20 will be used as the 20 high-order address bits. This leaves 4 spare bits, and it is convenient to use these as control bits. The communication system may have various possible design options for e.g. its memory (memories 13 and 14), such as whether the memory word length is 16 or 32 bits; the control bits in the bank register 31 can be used to match the specific details of the memory accesses of the host computer through the monitoring interface to the specific communication unit configuration.

The data channel from the host into the various components of the monitoring interface (the 3 sections of the bank register 31 and the bus 32) can of course be multiplexed in the monitoring interface to reduce the number of bit lines and interface pins required, e.g. to a single 16-bit channel. Such multiplexing (not shown) will of course be controlled by control signals into the monitoring interface from the host computer. (These control signals are of course distinct from the control bits used in the bank register 31, which are data bits as far as the loading of the bank register from the host computer is concerned.)

The fact that the bus 32 is 12 bits wide effectively divides the memory space of the unit into blocks or pages each of 4k words. A single monitoring access request can thus read out any desired portions of any such page. The particular addresses read out, and their sequence, is determined by the successive values which the host computer generates on bus 32 as the bottom 12 bits of the address on address bus 13.

If desired, bus 32 can be fed from a counter (not shown). This will relieve the host computer of the burden of generating the sequences of values (i.e. the sequence of bottom 12-bit address portions) on bus 32, but will only allow a sequence of consecutive addresses to be read. Obviously, the counter can, if desired, be driven by the host computer so that it can be preset to a desired value, and the range through which it counts can also be controlled by the host computer.

The description so far has been solely in terms of the host computer reading the selected memory area of the unit. However, the control signals coupled from the host computer preferably also include a read/write signal (not shown) which is multiplexed in multiplexer 18 with the read/write control signal (not shown) from the CPU. This will allow the host computer to force (write) predetermined information into both the unit and the input/output devices attached to it (into the memory, the registers, or both) in addition to reading from the unit.

The host computer can thus control the communication unit in the present system as in the known systems in which the host computer can drive specific registers in the communication unit. In fact, the present system allows the host computer to control the unit in considerably more detail. This allows the host to program the communication unit, either initially (by writing a desired program into e.g. a flash memory) or during operation, e.g. to upgrade its programs.

The description of the monitoring interface so far has been solely in terms of the host computer monitoring the internal operations of the communication unit and controlling those internal operations. Such monitoring and control is normally incidental to the primary purpose of the communication unit, that primary purpose being the transfer of data between the host computer and the communication systems to which the communication unit is coupled. Such data transfer is generally controlled by means having suitable protocols between the communication unit and the host computer.

Typically the host computer sends a set of control words (or bytes) to the communication unit, which stores them in its internal registers 16. The communication unit then uses that stored information to control the flow of data in itself. If data is to be passed to the host computer, the communication unit reads out words onto the data bus 12 for the host computer to receive; if data is to be received from the host computer on the data bus 12, the communication unit controls the writing in itself of the data so received.

The present monitoring interface can be used not only for the monitoring and control of the communication unit, as discussed above, but also as a data path. The host computer can use the monitoring interface as a data path for transferring data between itself and the communication unit. For this, the host computer must know where, in the communication unit, the information to be transferred resides. Also, the data being transferred must fit inside a single 4k page. Subject to these limitations, however, the monitoring interface can be used by both the host computer as a fast direct data transfer path with the communication unit which is an alternative to the primary data transfer path through the data bus transceivers 36.

The present monitoring interface has to have its bank register set up by the host computer, but after that has been done, the host computer can effectively treat the 4k page in the communication unit as part of its (the host's) memory space. That is, to access the 4k page, the host addresses its own normal memory space.

To avoid interference between the host's memory and the 4k page in the communication unit, the host preferably uses addresses in NXM (non-existent memory) for this; that is, it accesses addresses is a 4k page in a part of its memory space for which there is no real memory (or control registers, if the host uses the same techniques as the communication system for mapping its control registers into memory space). The high-order part of the memory addresses generated by the host locates the 4k page in the host's NXM, but is replaced by the contents of the bank register 31 as the addresses are passed through the monitoring interface into the communication system.

What is claimed is:

1. A communications unit for providing an additional data path comprising a processor (11), a data bus (12), an address bus (13), memory means (14–16), a data interface (36) between the data bus and a host computer (35), and a monitoring interface (30) with the host computer, characterized in that the monitoring interface comprises:

monitoring address generating means fed from the host computer and including a bank register (31) loadable by the host computer as its high-order portion and a direct path (32) from the host computer as its low order portion; and address coupling means (18) for passing the contents of the monitoring address generating means to the address bus (13) to address the memory means of the communications unit directly.

2. A unit according to claim 1, characterized in that the data bus (12) and the address bus (13) are multiplexed on a common physical bus.

3. A unit according to claim 1, characterized in that the memory means (14,15,16) attached to the data bus (12) and the address bus (13) is addressable by addresses placed on the address bus (13).

4. A unit according to claim 1, characterized in that the monitoring interface (30) provides a wait signal to the host computer (35) and a wait signal to the processor (11).

5. A unit according to claim 1, characterized in that the monitoring interface (30) includes an arbitrator (33) consisting of a state machine which arbitrates between requests from the host computer (35) and requests from the processor (11).

6. A unit according to claim 1, characterized in that the bank register (31) and the direct path are coupled to a common host bus (32) at their inputs.

7. A unit according to claim 1, characterized in that the bank register (31) comprises a plurality of sections (3×1 byte) which can be loaded sequentially from the host computer (35).

8. A unit according to claim 1, characterized in that the bank register (31) includes a portion which can be loaded by the host computer (35) with control bits for controlling mode options of the unit.

* * * * *